United States Patent
Brockmann et al.

(10) Patent No.: US 7,621,512 B2
(45) Date of Patent: Nov. 24, 2009

(54) STEAM INJECTION MODULE FOR HEATING PUMPED PRODUCTS

(75) Inventors: Gerhard Brockmann, Aerzen (DE); Regina Hermann, Bad Pyrmont (DE)

(73) Assignee: Stephan Machinery GmbH & Co., Hameln (DE)

( * ) Notice: Subject to any disclaimer, the term of this patent is extended or adjusted under 35 U.S.C. 154(b) by 474 days.

(21) Appl. No.: 10/567,132

(22) PCT Filed: Aug. 2, 2004

(86) PCT No.: PCT/DE2004/001730

§ 371 (c)(1),
(2), (4) Date: Jun. 13, 2006

(87) PCT Pub. No.: WO2005/013715

PCT Pub. Date: Feb. 17, 2005

(65) Prior Publication Data

US 2007/0128095 A1  Jun. 7, 2007

(30) Foreign Application Priority Data

Aug. 2, 2003 (DE) ................................. 103 35 554

(51) Int. Cl.
*B01F 3/04* (2006.01)
(52) U.S. Cl. ................ 261/77; 261/124; 261/DIG. 10; 422/26

(58) Field of Classification Search ................ 261/77, 261/124, DIG. 10, DIG. 76; 99/453, 483; 422/26, 307, 905
See application file for complete search history.

(56) References Cited

U.S. PATENT DOCUMENTS

| 4,160,002 A * | 7/1979 | Janovtchik ............... 261/76 |
| 4,674,888 A * | 6/1987 | Carlson ................... 366/337 |
| 4,723,483 A * | 2/1988 | Papchenko et al. ........... 99/451 |
| 6,186,481 B1 * | 2/2001 | Pirkle .................. 261/39.1 |
| 6,361,025 B1 | 3/2002 | Cincotta et al. |
| 7,025,338 B2 * | 4/2006 | Cincotta et al. ........... 261/64.1 |

FOREIGN PATENT DOCUMENTS

DE  19902610  6/2000

\* cited by examiner

*Primary Examiner*—Scott Bushey
(74) *Attorney, Agent, or Firm*—Horst M. Kasper

(57) ABSTRACT

The invention relates to a steam injection module (1), suitable for a unit for the pasteurization or sterilization of liquid to highly viscous food products. A steam tube (2) passes through a product line section (3), transverse to the longitudinal axis, made homogeneously from a single material by cutting with no welded seams. This steam tube (2) exhibits steam outlet openings (7) within the product line section (3). The hot steam at about 150 degrees centigrade is injected into the flowing product through the steam outlet openings. The product line section (3) and this steam cube (2) are each fixed by fixing flanges (8, 8', 9,9') in the total line set of the unit.

14 Claims, 2 Drawing Sheets

STEAM INJECTION MODULE FOR HEATING PUMPED PRODUCTS

CROSS-REFERENCE TO RELATED APPLICATIONS

This application is a United States entry into the national phase of the PCT-application with application number PCT/DE2004-001730 and filed on Aug. 2, 2004.

BACKGROUND OF THE INVENTION

1. Field of the Invention

The present Invention is concerned with a steam injection module for the heating of pumped products, in particular with a steel carrier, wherein the steel carrier holds a single part production element in its operating position, wherein the operating temperatures amount to up to 150 degrees centigrade.

2. Brief Description of the Background of the Invention Including Prior Art

Such a steam injection module is known in the state-of-the-art from the German printed Patent document 19902610 C1. The known steam injection module is incorporated into a plant for the heating of pumpable products, wherein the steam injection module is connected in series sequentially with a several steam injection modules. The steam injection module exhibits a steam pipe fed through perpendicular to the product transport direction and therewith radially through the free transport cross-section of the product line, wherein the steam pipe is connected in known plants with its one end at the coordinated steam connection line and with its other end to the coordinated cleaning agent connection line. The steam pipe is furnished with steam exit bore holes in the region of the product line cross-section and comprises plastic.

The known steam injection module exhibits further a product line section made out of plastic, wherein the product line section is welded to the steam pipe perpendicularly penetrating the product line section and thereby the product line section together with the steam pipe form a single part plastic element, wherein the single part plastic element is held in a stainless steel carrier.

It is felt to be disadvantageous in connection with this steam injection module that initially the product line section is inserted into the stainless steel carrier and is peened and bent to a flange at both of its ends for the production of the steam injection module and thereupon the required radial bore holes in the product line section are made, whereupon the steam pipe furnished already with the steam exit bore holes is inserted into the radial bore holes of the product line section, whereupon the two ends of the steam pipe are peened and bent to flanges and the steam pipe is welded to the product line section. This mode of production is comparatively complicated and cost intensive, since the single part plastic element is only in the incorporated state in the steel carrier welded to a single part plastic element, whereby the welding seams are generated, wherein a hygienic cleaning of the welding seams is only possible with difficulties.

As already mentioned above, several steam injection modules are connected successively in series in the plant for obtaining an improved steam distribution in the respective product. The injection region can be adapted in the power size to changed conditions, for example to an increased production throughput, by the installation of additional steam injection modules. The size of the steam injection modules can be selected depending on the product viscosity and the throughput power. The disintegration of the product for increasing the surface for the steam injection is achieved by the disposition of the steam pipe furnished with the steam exit bore holes radially to the product flow. The number of the injection bore holes for each module results here again depending on the product viscosity and the throughput power. The injection bore holes can here be formed cylindrical or with a conical exit for optimizing the steam distribution. The disposition of the injection bore holes in the steam pipe is performed depending on the product requirements. An improvement of the distribution of the product by the steam beams is achieved by having the injection bore holes disposed perpendicular or opposite to the product stream direction. An injector effect is obtained by having the injection bore holes disposed in flow direction, wherein the injector effect can partially compensate pressure losses in case of highly viscous products.

It is advantageous when at least the inner jacket face of the product line exhibits a low frictional coefficient relative to the product to be transported in order to avoid attachments and burning in into the product line and/or on the steam pipe and in order to minimize pressure losses. Here it is advantageous where both the product line as well as the steam pipe are formed of plastic, preferably out of PTFE or PFA.

Therefore it is an object of the present Invention to furnish a steam injection module, where the individual parts of the steam injection module can be produced in a simple manner, wherein the mounting and assembly of the steam injection module is simple and where the cleaning process corresponds to the hygienic requirements of food production.

SUMMARY OF THE INVENTION

1. Purposes of the Invention
2. Brief Description of the Invention

A steam injection module (1) is furnished for incorporation into a plant for pasteurizing/sterilizing of liquid to highly viscous, pumpable, continuously transported products and has a product line section (3), wherein the product is led through the product line section (3), and has a steam tube (2) essentially perpendicular penetrating through the product line section (3) and has a steel carrier (5,6). The product line section (3) and the steam tube (2) is a non-welded, single part production element, wherein the non-welded, single part production element is surrounded by a carrier (5,6) subdivided into at least two parts (5,6).

The non-welded, single part production element is preferably made out of plastic or a ceramic, and the plastic can be a poly tetra fluoro-ethylene (PTFE). The steam tube (2) can exhibit steam exit bore holes (7) within the product line section (3). The steam exit bore holes (7) can be disposed oppositely to each other. The steam tube (2) can exhibit in each case a flange (8,8') at its two ends. The product line section (3) can exhibit in each case a flange (9,9') at its two ends.

The diameter of the product line section (3) can be larger than the diameter of the steam tube line (2). The steel carrier can comprise two parts (5,6), wherein the inner recesses (10,11) of the two parts (5,6) correspond to the outer geometric dimensions of the non-welded, single part production element. The two steel carrier parts (5,6) can be held together by at least two attachment elements. The attachment elements are preferably screw connections. The steel carrier parts (5,6) can be formed half shell shaped and can exhibit bore holes (14,14') at their front faces (13,13'), wherein at least one bore hole of the bore holes (14,14') is a threaded bore hole. The non-welded, single part production element can be produced by metal cutting and machining away and wherein the non-welded, single part production element does not exhibit any corners and edges in the interior. The connection positions (15) between the product line section (3) and the steam tube (2) can be formed rounded.

The steam injection module according to the present Invention is for incorporation into a plant for pasteurizing/sterilizing of liquid to highly viscous, pumpable, continuously transported products by steam injection and having a production line section, wherein the product is fed through the production line section and having the steam tube penetrating substantially perpendicular to the product line section and having a steel carrier, and wherein the steam injection module features a production part of the product line section and the steam tube, wherein the production part is surrounded by an at least twofold divided carrier.

It is advantageous here that the single part production element is produced out of a suitable plastic such as for example poly tetra fluoro-ethylene (PTFE).

It is furthermore advantageous that the steam tube penetrating the product line exhibits steam exit bore holes, wherein the steam exit bore holes are disposed such that they do not impedingly influence the flowing product from a flow technological point of view.

It is further advantageous that the steam tube line exhibits at its two ends in each case a flange for the attachment at the further pipe lines.

It is also advantageous that the product line section exhibits at its two ends in each case a flange.

It is particularly advantageous that the steel carrier comprises at least two parts, wherein the internal recesses of the two parts correspond to the outer geometric dimensions of the single part production element.

It is advantageous that the two steel carrier parts are held together by at least one attachment element, wherein the attachment elements are screw connections or similar attachments.

In addition it is advantageous that the steel carrier parts are formed like half shells and exhibit bore holes at their front faces, wherein at least one bore hole of the bore holes is a threaded bore hole, and the wherein an attachment screw can be screwed into the threaded bore hole.

It is also advantageous that the single part production element is produced by machining down and metal cutting out of a material part and that the single part production element does not exhibit corners and edges in its interior.

It is furthermore advantageous that the connection positions between the product line section and the steam tube are rounded.

In the following the Invention is illustrated in more detail by way of drawings. There is shown in:

DESCRIPTION OF INVENTION AND PREFERRED EMBODIMENT

Figure 1:
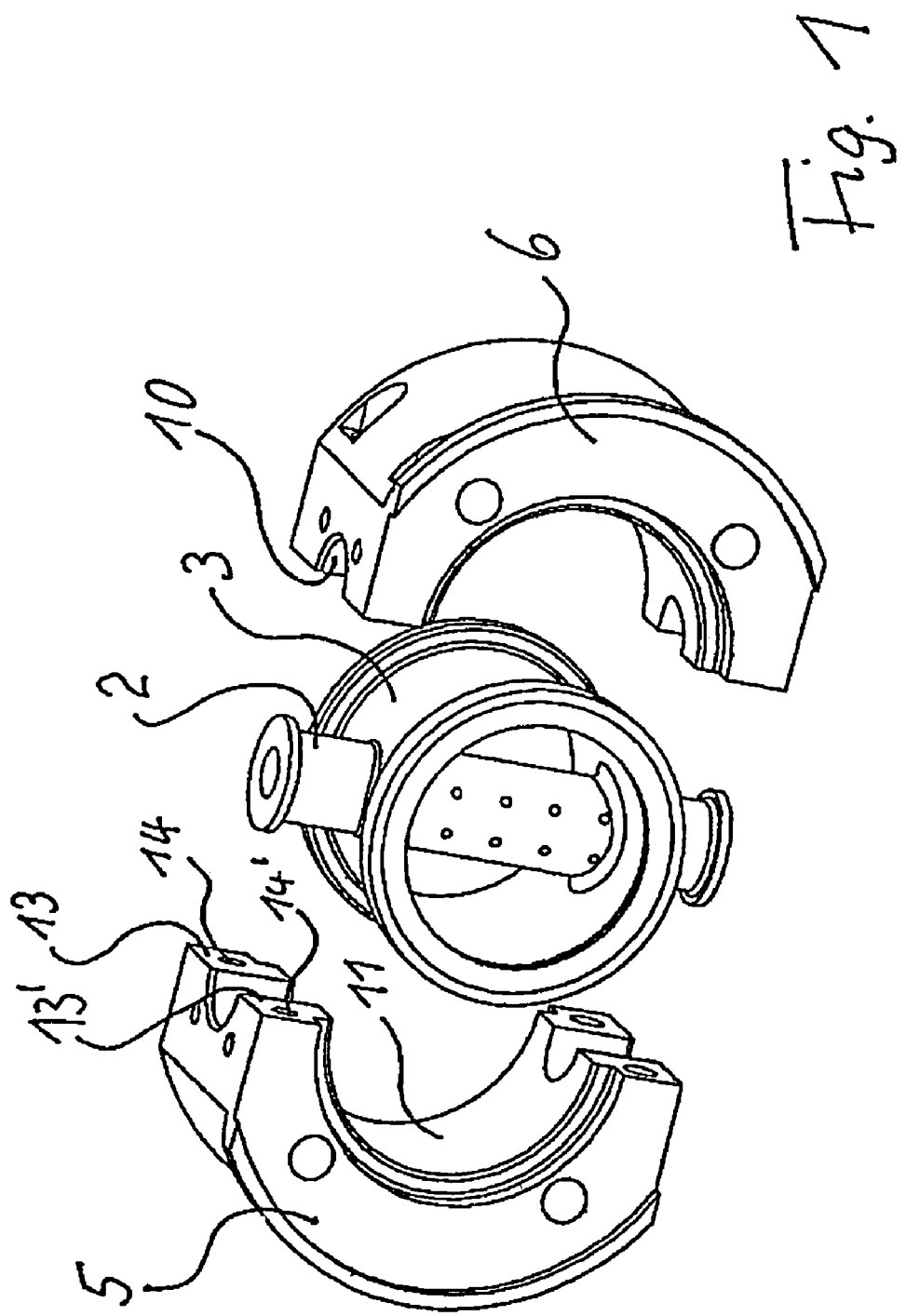
FIG. 1: a perspective, schematic explosive presentation of the injection module (1)

FIG. 1 shows a perspective schematic explosive representation of the injection module 1. The injection module 1 essentially is composed out of a multipart steel carrier 5,6, wherein the multipart steel carrier 5,6 surrounds the single part production element comprised out of a product line section 3 and a steam tube 2 disposed perpendicular to the product flow direction in the product line section 3. The single part production element is described in more detail below. The single part production element is surrounded by a multipart steel carrier 5,6, wherein the internal recesses 10, 11 of the steel carrier 5,6 are adapted to the outer geometric dimensions of the single part production element. The recess 10 surrounds for example shape matchingly the steam tube 3 around its outer ends. The recess 11 of the multipart steel carrier 5,6 surrounds shape matchingly the product line section 3 and is in the present embodiment round shaped. The shape matching steel carrier 5,6 is subdivided in the middle in order to alleviate the mounting and assembly of the complete steam injection module 1, such that each part of the steel carrier 5,6 exhibits two or, respectively, four front faces 13,13'. These front faces 13,13' include in each case a bore hole, wherein at least one of the bore hole is a threaded bore hole, wherein the thread of a screw (not shown here) is inserted into the threaded bore hole. The same construction of the bore holes is present at the lower part of the front faces. It would also be conceivable to dispose hinge elements instead of the lower screw connections or, respectively, bore hole, such that the two steel carrier parts 5,6 can be flipped apart at the top and can be held together hingedly at the bottom. Therefore the two steel carrier parts 5,6 surrounds the single part form element out of plastic or ceramic in the assembled or joined state, thereby a secure seating of the product line 3 is assured.

Figure 2:
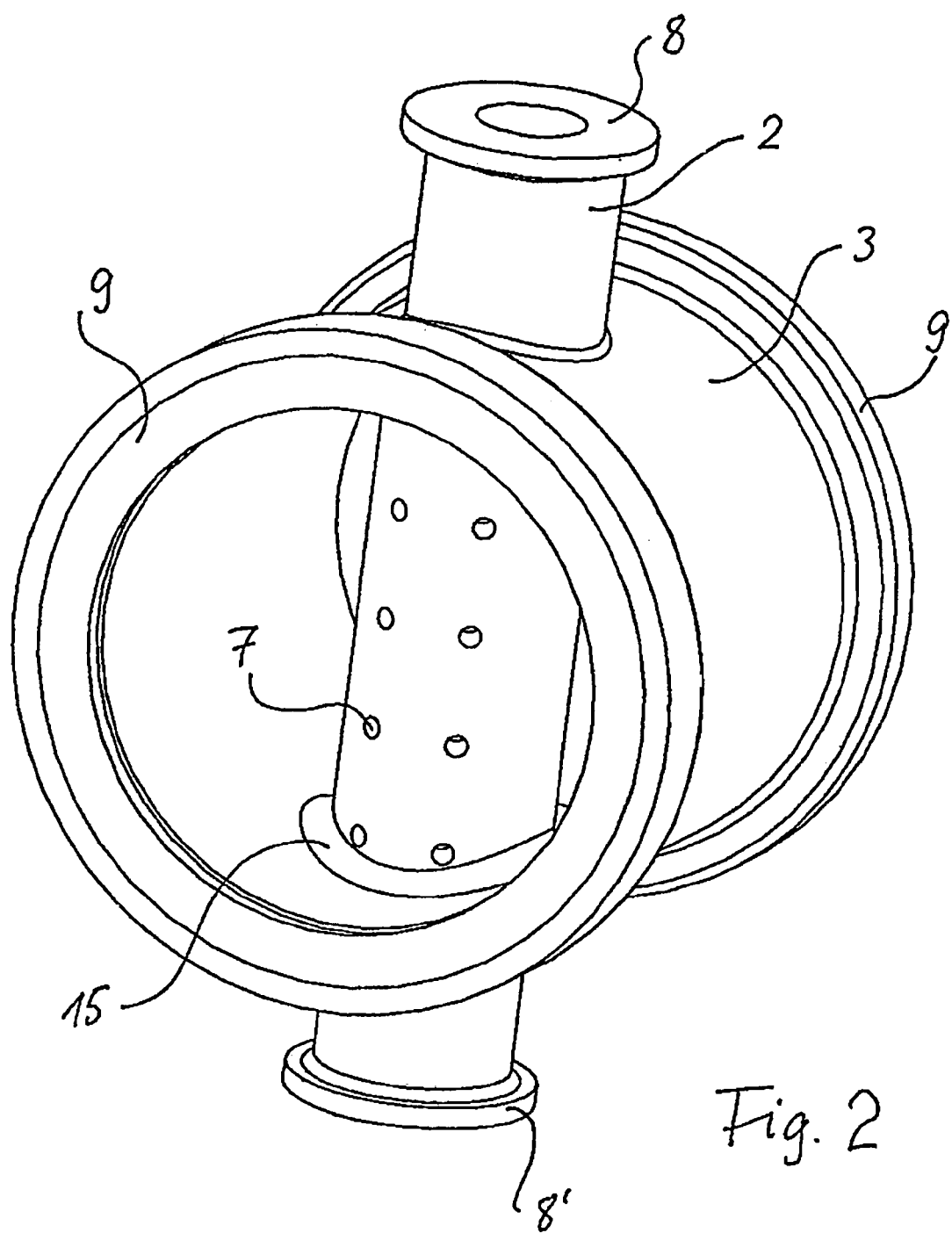
FIG. 2: a perspective schematic presentation of the product line section (2) with the penetrating steam tube (3).

FIG. 2 shows the single part production element comprising the product line section 3 and the steam tube 2 in a perspective illustration. The product line section 3 is formed round in cross-section according to the present embodiment, that is therefore a tube piece, wherein in each case an attachment flange 9,9' is located at the two ends of the tube piece. The attachment flange is 9,9' joined the product pipe line together with the steam injection module 1. A steam tube 2 is disposed approximately perpendicular to the longitudinal axis of the product line section 3, wherein the steam tube penetrates through the product line section 3. The diameter of the steam tube 2 is substantially smaller as compared to the diameter of the product line section 3, wherein the diameter of the steam pipe line 2 has to assume an optimum size for functional reasons. The steam exit bore holes 7 are placed in the steam tube 2 in the interior of the product line section 3, wherein the arrangement and the number of the steam exit bore holes 7 is to be selected such that steam exit bore holes 7 do not interferingly influence the course of the flow of the product flowing through. The locations where the steam line 2 pushes through the product line section 3 are completely rounded such that no recesses or corners are formed wherein product residues attach and burn of in the recesses or corners. Therefore the interior chamber of the product line section 3 does not show any corners, holes or edges. The reason for this is based on the fact that the complete part was produced by metal cutting and machining away. The steam tube line 2 exhibits at its ends in each case an attachment flange 8,8'. The material, out of which both the productive line section 3 as well as the steam tube 2 are produced, can be plastic, preferably a poly tetra fluoro-ethylene (PTFE) or a ceramic material.

The invention claimed is:

1. Steam injection module (1) for incorporation into a plant for pasteurizing/sterilizing of liquid to highly viscous, pumpable, continuously transported products and having a product line section (3), wherein the product is led through the product line section (3), and having a steam tube (2) essentially perpendicular penetrating through the product line section (3) and having a steel carrier (5,6), characterized in that the product line section (3) and the steam tube (2) is a non-welded, single part production element, wherein the non-welded, single part production element is surrounded by a carrier (5,6) subdivided into at least two parts (5,6).

2. Steam injection module according to claim 1, wherein the non-welded, single part production element is made out of plastic or a ceramic.

3. Steam injection module according to claim 2, wherein the plastic is a poly tetra fluoro-ethylene (PTFE).

4. Steam injection module according to claim 1, wherein the steam tube (2) exhibits steam exit bore holes (7) within the product line section (3).

5. Steam injection module according to claim 4, wherein the steam exit bore holes (7) are disposed oppositely to each other.

6. Steam injection module according to claim 1, wherein the steam tube (2) exhibits in each case a flange (8,8') at its two ends.

7. Steam injection module according to claim 1, wherein the product line section (3) exhibits in each case a flange (9,9') at its two ends.

8. Steam injection module according to claim 1, wherein the diameter of the product line section (3) is larger than the diameter of the steam tube (2).

9. Steam injection module according to claim 1, wherein the steel carrier comprises two parts (5,6), wherein the inner recesses (10, 11) of the two parts (5,6) correspond to the outer geometric dimensions of the non-welded, single part production element.

10. Steam injection module according to claim 1, wherein the two steel carrier parts (5,6) are held together by at least two attachment elements.

11. Steam injection module according to claim 10, wherein the attachment elements are screw connections.

12. Steam injection module according to claim 1, wherein the steel carrier parts (5,6) are formed half shell shaped and exhibit bore holes (14,14') at their front faces (13,13'), wherein at least one bore hole of the bore holes (14,14') is a threaded bore hole.

13. Steam injection module according to claim 1, wherein the non-welded, single part production element is
   produced by metal cutting and machining away and wherein the non-welded, single part production element does not exhibit any corners and edges in the interior.

14. Steam injection module according to claim 1, wherein the connection positions (15) between the product line section (3) and the steam tube (2) are formed rounded.

* * * * *